US007777918B2

(12) United States Patent
Sekizawa et al.

(10) Patent No.: US 7,777,918 B2
(45) Date of Patent: Aug. 17, 2010

(54) IMAGE FORMING APPARATUS AND METHOD OF CONTROLLING THE APPARATUS

(75) Inventors: Hidekazu Sekizawa, Yokohama (JP); Naoyuki Misaka, Sunto-gun (JP); Jun Sakakibara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 806 days.

(21) Appl. No.: 11/669,306

(22) Filed: Jan. 31, 2007

(65) Prior Publication Data

US 2008/0180514 A1 Jul. 31, 2008

(51) Int. Cl.
*H04N 1/409* (2006.01)

(52) U.S. Cl. ...................... 358/3.26; 358/1.9; 358/1.14; 358/461; 382/274; 382/275

(58) Field of Classification Search ................. 358/401, 358/448, 461, 462, 474, 1.1, 1.9, 1.14, 3.26, 358/3.27; 382/274, 275
See application file for complete search history.

(56) References Cited

U.S. PATENT DOCUMENTS

| | | | | |
|---|---|---|---|---|
| 7,231,098 | B2 * | 6/2007 | Wang | 382/274 |
| 7,518,757 | B2 * | 4/2009 | Chizawa et al. | 358/461 |
| 7,525,703 | B2 * | 4/2009 | Yasuda | 358/521 |
| 7,558,437 | B2 * | 7/2009 | Misaka | 382/275 |
| 2005/0179954 | A1 * | 8/2005 | Arai et al. | 358/3.26 |
| 2006/0061830 | A1 * | 3/2006 | Sakakibara | 358/448 |

FOREIGN PATENT DOCUMENTS

| | | |
|---|---|---|
| JP | 02-155373 | 6/1990 |
| JP | 09-149251 | 6/1997 |

* cited by examiner

*Primary Examiner*—Thomas D Lee
(74) *Attorney, Agent, or Firm*—Turocy & Watson, LLP

(57) ABSTRACT

An image forming apparatus applies a shading correction to an image read from a white reference board 18, and determines presence or absence of stripe-like noise in the image read therefrom after applying the shading correction. The apparatus exposes an area at which there is no noise in the white reference board 18 to create a white reference value for a shading correction for reading a document after that time.

13 Claims, 9 Drawing Sheets

IMAGE FORMING APPARATUS AND METHOD OF CONTROLLING THE APPARATUS

BACKGROUND OF THE INVENTION

An image forming apparatus, such as a copying machine, brings an exposure lamp into a reciprocating motion along with a document platen to scan a document on the document platen by the light from the exposure lamp in the reciprocation. The reflected light from the document obtained though the exposure scanning is irradiated to a charge coupled device (CCD) sensor that is a photoelectric conversion element via an optical lens. The CCD sensor receives the reflected light form the document onto a light receiving face thereof to make line scanning on the light receiving face then outputs an image signal with a level corresponding to a light receiving quantity. Thus, the image on the document is optically read, and the read image is formed on a copying paper.

The CCD sensor causes a problem of variance of sensitivity for each CCD sensor, or of unevenness due to changes with age. The brightness of the exposure lamp is also uneven for each lamp, or has unevenness resulted from changes with age.

Therefore, such a copying machine performs exposure-scanning of a white reference board which has been prepared in advance before exposure-scanning to read the document. The copying machine stores the output from the CCD sensor obtained through the exposure-scanning as a white reference value, and the machine corrects the output from the CCD sensor for exposure-scanning to read the document after that time in accordance with the obtained white reference value. This correction, a so-called shading correction eliminates spots of the read image due to the unevenness of the CCD lamp, the exposure lamp, the optical lens, etc.

However, granularity of the surface of the white reference board, dust attached thereto, dirt attached thereto, or the like produce the problem such that stripe-like noise appears in the read image.

BRIEF SUMMARY OF THE INVENTION

An object of an aspect of the invention is to provide an image forming apparatus capable obtaining an excellent read image without stripe-like noise regardless of granularity of the surface of a white reference board, dust attached thereto, and dirt attached thereto, or the like.

An image forming apparatus according to an aspect of the invention comprises:

a document platen to which a document is set;

a white reference member;

an exposure lamp to expose the document and the white reference member;

a photoelectric conversion element which receives reflected light from the document and the white reference member when the document is exposed by the exposure lamp and the white reference member is exposed by the exposure lamp to output an image signal with a level corresponding to a light receiving quantity; and an image processing unit which has a first processing unit to expose the white reference member by the exposure lamp, and to create a white reference value for a shading correction from the output from the photoelectric conversion element at that time, and also has a second processing unit to expose the document by the exposure lamp, to apply a shading correction to the output from the photoelectric conversion element at that time in accordance with the white reference value, and to obtain an image read from the document, wherein the first processing unit comprises:

a first control section which performs line scanning an un-scanned area of the white reference member by the exposure from the exposure lamp to obtain a signal corresponding to an image of the white reference member from the photoelectric conversion element;

a second control section which stores the output from the photoelectric conversion element in the line scanning in the first control section as a white reference value for the shading correction;

a third control section which performs line scanning to an un-scanned area differing from that of by the first control section by the exposure from the exposure lamp;

a correction section which applies the shading correction to the output from the photoelectric conversion element in line scanning by the third control section in accordance with the white reference value to obtain an image read from the white reference member;

a detection section which detects a similarity degree in a main scanning direction and a similarity degree in a sub-scanning direction of the image read by the correction section;

a determining section which determines presence or absence of stripe-like noise in the image read by the correction section from each similarity detected by the detection section;

a fourth control section which moves line scanning positions in the first control section to repeat processing by the second section, the third section, the correction section, the detection section, and the determining section when the determination result from the determining section shows the presence of the noise;

a storage section which stores the line scanning position by the first control section when the determination result from the determining section shows the absence of the noise as a line scanning position to the white reference member in creating the next white reference value; and a decision section which decides the white reference value, at the time when the determination result from the determining section shows that there is no noise, as a white reference value for a shading correction in reading a document after that time among each white reference value stored by the second control section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

DETAILED DESCRIPTION OF THE INVENTION

Hereinafter, embodiments of the present invention will be described with reference to the drawings.

Figure 1:
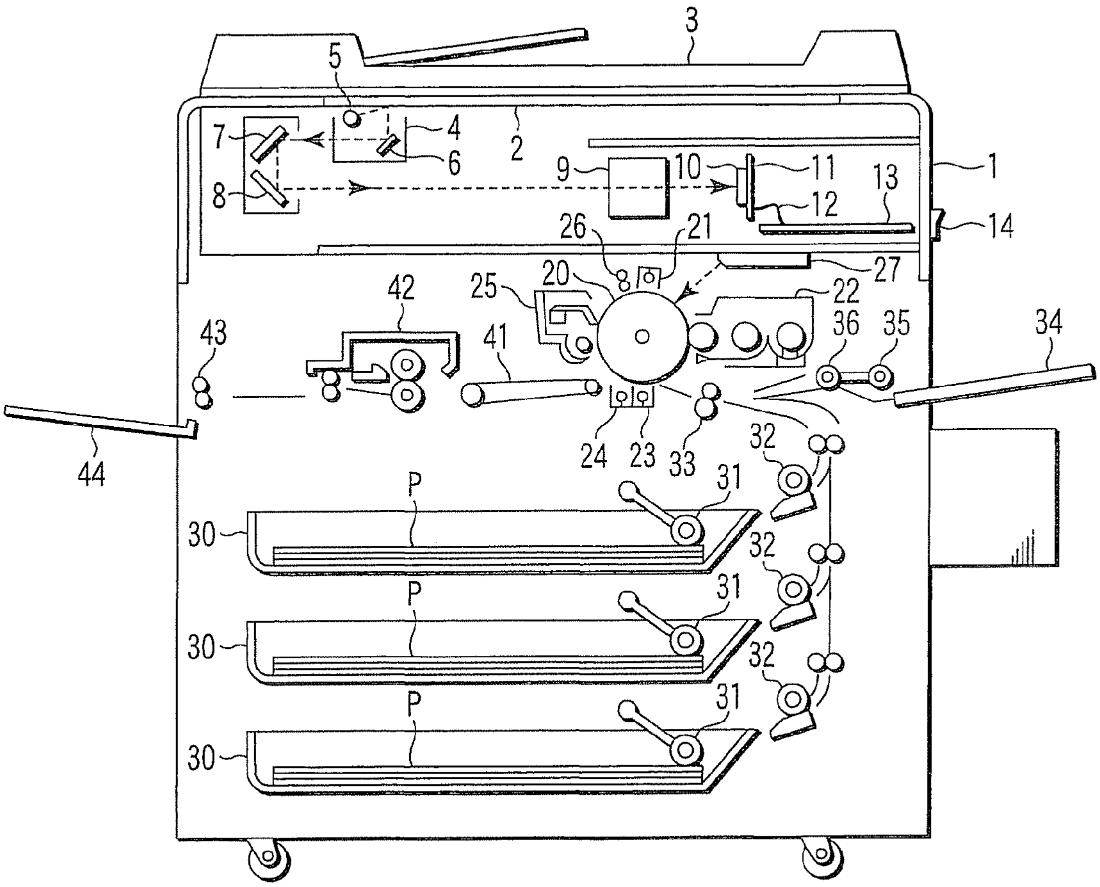
FIG. 1 is an exemplary view depicting an inner constitution of an embodiment of the invention.

At first, as shown in FIG. 1, a transparent document platen (glass board) 2 for document setting is provided for an upper section of a main body 1. An automatic document feeder (ADF) 3 is disposed on the document platen 2 so as to freely open and close. The ADF 3 automatically feeds documents to be set to the document platen 1 one by one.

Figure 2:
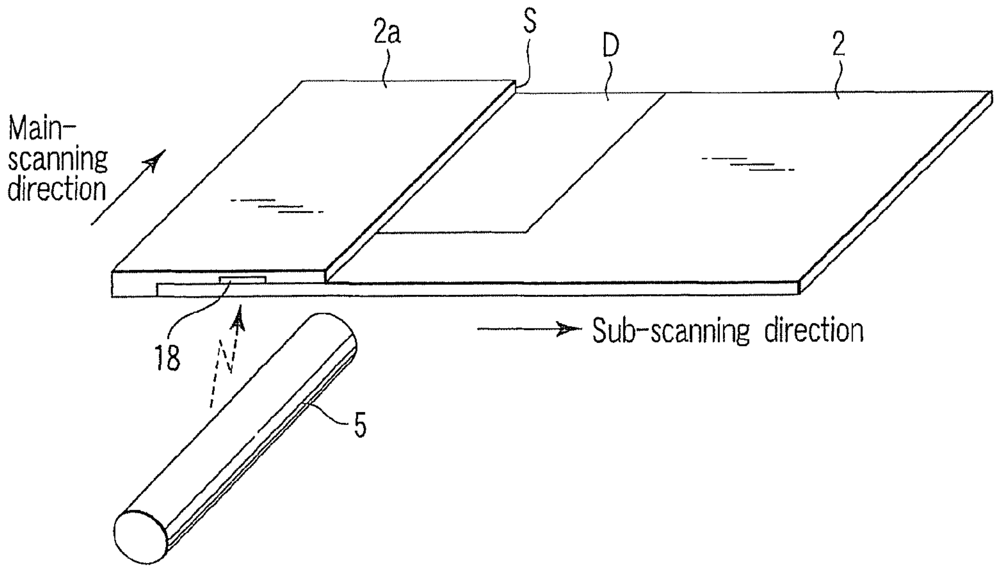
FIG. 2 is an exemplary view depicting a constitution of a document platen and its peripheral section of the embodiment.

An indicator unit 2*a* is, as shown in FIG. 2, disposed on one side of the document platen 2. The step difference between the indicator unit 2*a* and the document platen 2 makes a standard position S for document setting. The document D is set in accordance with the standard position S. That is, an indicator unit 2*a* side (left side in FIG. 2) is defined as a document non-setting area, and the rest side (right side in FIG. 2) is defined as a document setting area while forming the boundary by the standard position S for the top end of the document D.

A carriage 4 is provided on the lower side of the document platen 2, and an exposure lamp 5 is provided for the carriage 4. The carriage 4 and the exposure lamp 5 consist of an exposure means. The carriage 4 may reciprocate along with the lower surface of the document platen 2. Lighting the exposure lamp 5, while the carriage 4 reciprocates from the document non-setting area to the document setting area, generates exposure scanning of the lower face side of the indicator unit 2*a* and the document D on the document platen 2.

The reciprocating direction of the exposure lamp 5 is referred to as a sub-scanning direction, and the direction perpendicular to the sub-scanning direction is referred to as a main scanning direction.

The exposure scanning by the exposure means generates a reflected optical image of the document D which has been set onto the document platen 2 and reflection mirrors 6, 7 and 8, and a lens block 6 for variable power project the optical image to a photoelectric conversion element, for example, a charge coupled device (CCD) sensor 10. The CCD sensor 10 arranges a large number of light receiving elements in the so-called main scanning direction perpendicular to the sub-scanning direction that is the reciprocating direction of the exposure lamp 5, and outputs an image signal with a voltage level corresponding to the light receiving quantities of each light receiving element. The CCD sensor 10 is attached to a sensor substrate 11. A control substrate 13 is connected to the sensor substrate 11 through a harness line 12.

The image signal output from the CCD sensor 10 is amplified by a below-mentioned analog processing circuit 75 on the control substrate 13 and also converted into a digital signal. After the digital signal is appropriately image-processed by the below-described image processing unit 73 on the control substrate 13, the digital signal is supplied to a laser unit 27. The laser unit 27 generates a laser beam in response to an input signal.

A power switch 14 is disposed on the outer circumference surface of the main body 1.

A white reference board 18 that is a white reference member for shading correction is disposed on the lower face side of the indicator 2*a* that is the document non-setting area.

Figure 3:
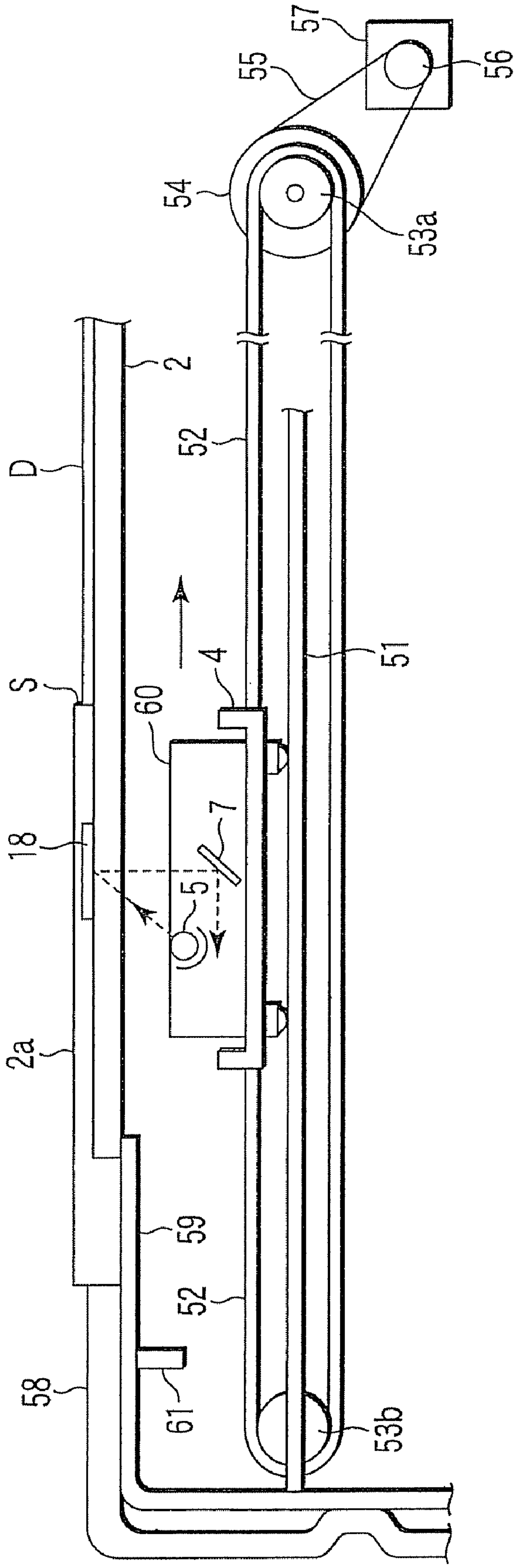
FIG. 3 is an exemplary view depicting a constitution of an exposure lamp and its peripheral section of the embodiment.

The carriage 4 is, as illustrated in FIG. 3, set onto a rail 51 so as to freely move thereon. A wire 52 is coupled to the carriage 4, and the wire 52 is extending with tension between a driving pulley 53*a* and a driven pulley 53*b*. The driving pulley 53*a* is coupled to a deceleration pulley 54, and the deceleration pulley 54 is coupled to a pulley 56 of a scanning motor 57 through a timing belt 55. The number of applying of drive voltage pulses (number of steps) to the scanning motor (stepping motor) 57 manages the moving position of the carriage 4.

The outer circumference surface of the main body 1 is formed of a cover 58. A frame 59 to hold the rail 51 is disposed inside the cover 58. The frame 59 has a home switch 61. The home switch 61 has a slit to receive penetration of a light shielding board 60 attached to the carriage 4, and optically senses whether or not the light shielding board 60 is penetrated into the slit. When the home switch 61 detects the penetration of the shielding board 60, it is determined that the carriage 4 is positioned as a predetermined home position.

On the other hand, as shown in FIG. 1, a photoreceptor drum 20 is rotatably disposed at the almost center section inside the main body 1. Around the drum 20, an electrical charging unit 21, a development unit 22, a transfer unit 23, a peeling unit 24, an electrical discharging unit 26 are arranged step by step. The laser beam generated from the laser unit 27 is irradiated onto the surface of the drum 20 while the beam passes though the gap between the charging unit 21 and the development unit 22.

The main body 1 includes a plurality of paper feeding cassettes 30 on the bottom thereof. Each cassette 30 stores a number of sheets of copying paper differing from one another in size as image forming media. Upon depressing a print key (not shown) disposed on the upper surface of the main body 1, the copying paper P is picked up one by one from any one of each paper feeding cassette 30. Pick-up rollers 31 are disposed for each paper feeding cassette 30 so as to pick up the copying paper P. The picked up copying paper P is separated from the cassettes 30 by the separators 32, respectively, to be fed to a resist-roller 33. The resist-roller 33 feeds the copying paper P between the drum 20 and the transfer unit 23 at the timing at which the consideration of the rotation of the drum 20 has been taken.

The electrical charging unit 21 electrostatically charges the surface of the photoreceptor drum 20 by applying a high-voltage thereto. Irradiating laser beam generated from the laser unit 27 onto the surface of the already charged drum 20 forms an electrostatic latent image on the surface of the drum 20.

Receiving a developer (toner) by the development unit 22 makes the electrostatic latent image on the drum 20 apparent. The apparent image is transferred onto the copying paper P by means of the transfer unit 23. The copying paper P with the apparent image transferred thereon is peeled from the drum 20 by the peeling unit 24. The peeled copying paper P is fed to a fixing unit 42 by means of a carrying belt 41. The fixing unit 42 fixes the transferred image on the copying paper P with the heat. The already fixed copying paper P is ejected to a paper ejecting tray 44 by means of an ejecting roller 43.

The developer and the electric charge remain on the surface of the drum 20 with the copying paper P peeled therefrom. A cleaner 25 removes the residual developer. An electrical discharging unit 26 removes the residual electrical charge.

Figure 4:
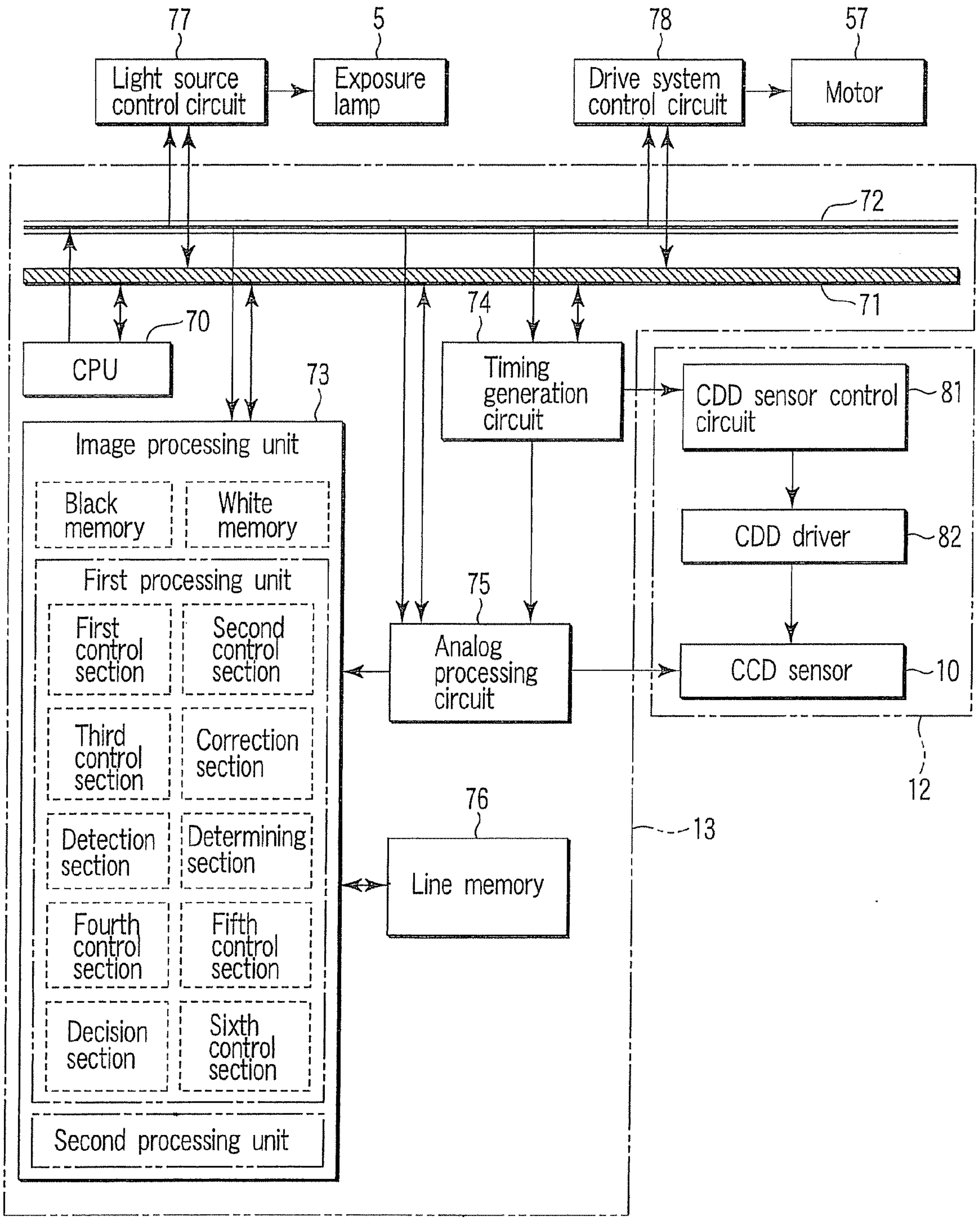
FIG. 4 is an exemplary block diagram of a control circuit of the embodiment.
Figure 5:
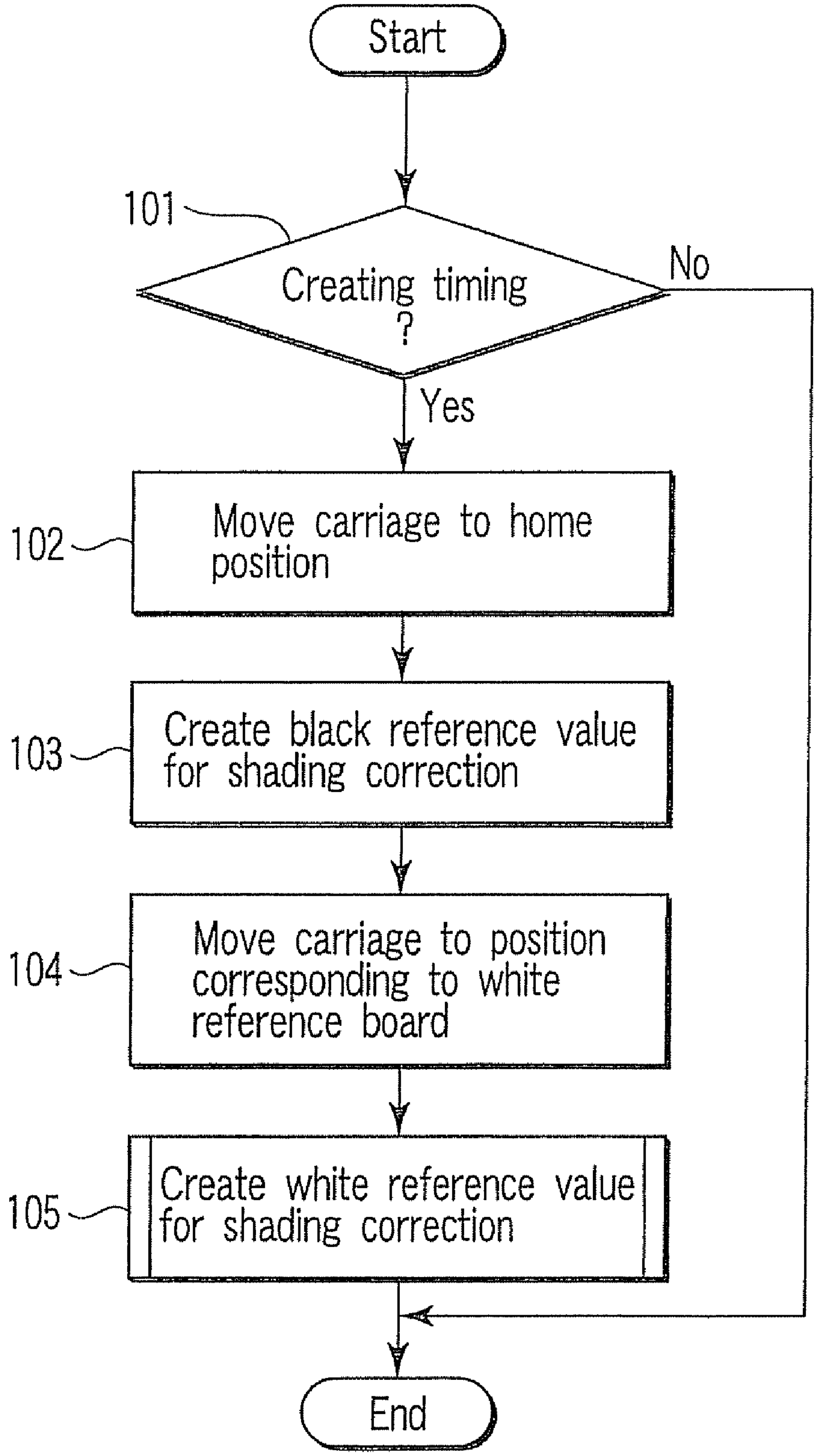
FIG. 5 is an exemplary flowchart for explaining creation of a black reference value and a white reference value of the embodiment.

FIG. 4 illustrates a principal part of a control circuit mounted on the sensor substrate 12 and the control substrate 13.

A data bus 71 and an address bus 72 are connected to a CPU 70. An image processing unit 73, a timing generation circuit 74, and an analog processing circuit 75 are connected to the data bus 71 and the address bus 72. A line memory 76 to be used for image processing is connected to the image processing unit 73. A CCD sensor control circuit 81 is connected to the timing generation circuit 74. The CCD sensor control circuit 81 controls an operation of a CCD driver 82. The CCD driver 82 drives the CCD sensor 10. The output from the CCD sensor 10 is supplied to the analog processing circuit 75. On the other hand, a light source control circuit 77 and a drive system control circuit 78 are connected to the data bus 71 and the address bus 72. The light source control circuit 77 drive-controls the exposure lamp 5. The drive system control circuit 78 drive-controls the scanning motor 57.

The image processing unit 73 includes a black memory, a white memory, a first processing unit, and a second processing unit. The first processing unit exposes the white reference board 18 by the exposure lamp 5 to creates the white reference value for shading correction on the basis of the output from the CCD sensor 10 at that time, and also creates the output from the CCD sensor 10 when the exposure lamp is turned off as the black reference value for the shading correction after that time. The created black and white reference values are stored in the black memory and the white memory, respectively. The second processing unit exposes the document D by the exposure lamp 5, and obtains the image read from the document D by shading-correcting the output from the CCD sensor 10 at that time in accordance with the white reference value.

Especially, the first processing unit includes the following sections (1) to (11).

(1) A first control section to line-scan an un-scanned area of the white reference member 18 by the exposure from the exposure lamp 5 and obtain a signal corresponding to the image of the white reference member from the CCD sensor 10.

(2) A second control section to store the outputs from the CCD sensor 10 in line scanning by the first control section as the white reference value for the shading correction. The second control section, more specifically, obtains an averaged value of the outputs from the CCD sensor 10 in exposing by the first control section to store the averaged value as the white reference value for the shading correction.

(3) A third control section to line-scan the un-scanned area differing from the first control section by the exposure from the exposure lamp 5.

(4) A correction section to shading-correct the outputs from the CCD sensor 10 in line scanning in the third control section depending on the white reference value and obtain the image read from the white reference member 18. The correction section, more specifically, obtains the averaged value of the outputs from the CCD sensor 10 in exposing by the third control section to shading-correct the averaged value according to the white reference value.

(5) A detection section to detect a similarity degree in a main scanning direction of a read image and a similarity degree in a sub-scanning direction of a read image obtained by the correction section.

(6) A determining section to determine the presence or absence of stripe-like noise in the read image obtained by the correction section on accordance with each similarly detected by the detection section. The determining section, more specifically, determines that there is stripe-like noise in the part of an image corresponding to each similarity degree when each similarity degree detected by the detection section is equal to or larger than predetermined set values, and determines that there is no stripe-like noise in the part of the image corresponding to each similarity degree when each similarity degree detected in the detection section is smaller than the set values.

(7) A fourth control section to move the line scanning position by the first control section to repeat the second control section, the third control section, the correction section, the detection section, and the determining section when the determination result from the determining section shows that there is noise.

(8) A fifth control section to move the line scanning position by the first control section to repeat the second control section, the third control section, the correction section, the detection section, and the determining section when the determination result from the determining section shows that there is no noise.

(9) A storage section to store the line scanning position by the first control section as the line scanning position for the white reference member in creating the next white reference value when the determination result shows that there is no noise.

(10) A decision section for obtaining an averaged value of each white reference value when the determination result from the determining section shows that there is no noise to decide the averaged value as the white reference value for the shading correction in reading the document D after that time among each white reference value stored by the control section after repeating by the fifth control section.

(11) To decide the outputs from the CCD sensor, in turning off the exposure lamp 5, as the black reference value for the shading correction in reading the document D after that time.

Operations will be described hereinafter.

When the power switch 14 is turned on, under the determination that it is the timing for creating the black and the white reference values (YES, in step 101), the carriage 4 is moved to the home position (step 102). At the home position, in a state in which the exposure lamp 5 is switched off, the first processing unit executes the line scanning, for example, the line scanning of four pieces of lines, and decides (creates) the averaged value of the outputs from the CCD sensor 10 as the black reference value for the shading correction after that time (step 103). The decided black reference value is stored in the black memory of the image processing unit 73.

After this, the carriage 4 is moved to the position facing the white reference board 18 (step 104). The exposure lamp 5 is switched on to expose the white reference board 18, and the white reference value for the shading correction after that time is decided (created) (step 105). The decided white reference value is stored in the white memory of the image processing unit 73.

Figure 6:
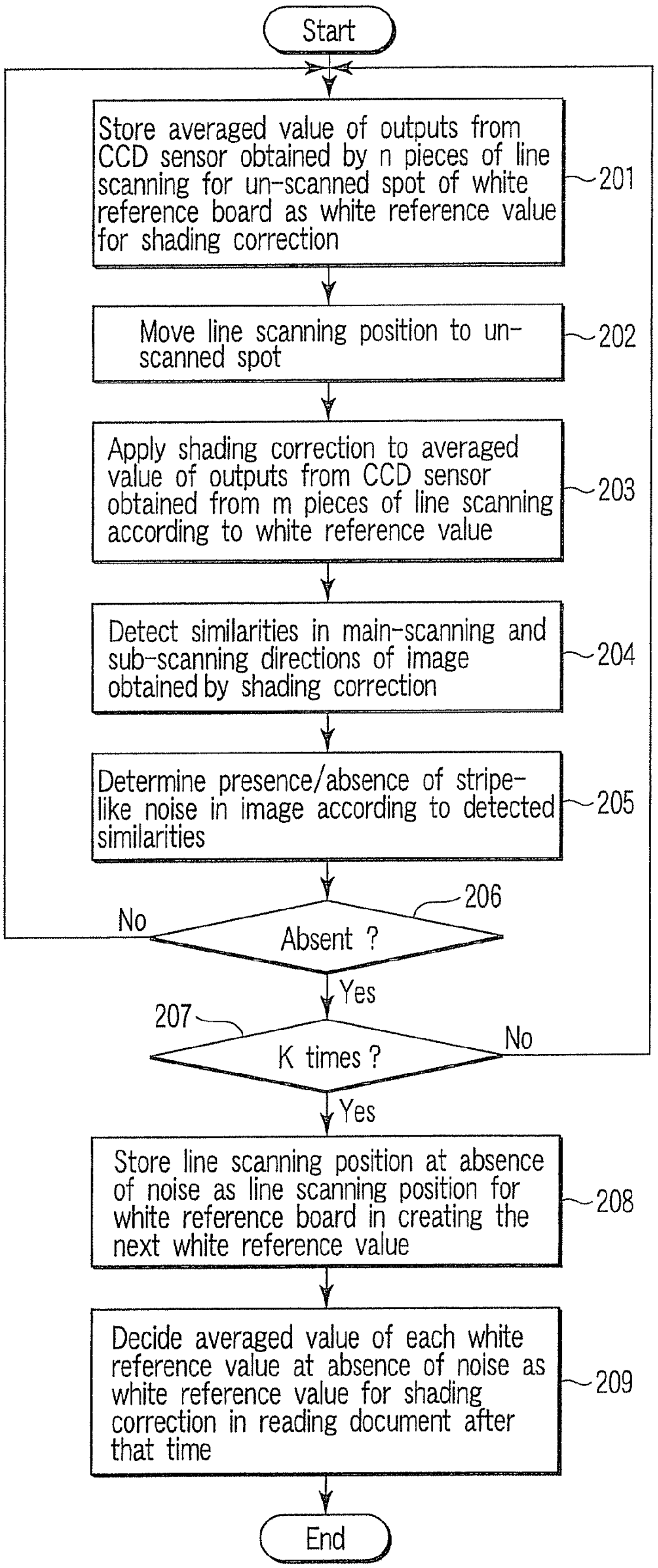
FIG. 6 is an exemplary flowchart depicting a creation routine of a white reference value at the time of power-on in the embodiment.

FIG. 6 depicts a creation routine of the white reference value when power is turned on.

Namely, n pieces of lines, for instance, four pieces of lines of line scanning for the un-scanned area of the white reference member 18 is executed by the exposure from the exposure lamp 5, and the signals corresponding to the image of the white reference member 18 are output from the CCD censor 10. The first processing unit obtains the averaged value of the outputs from the CCD sensor 10, and stores the averaged value as the white reference value for the shading correction (step 201).

Figure 7:
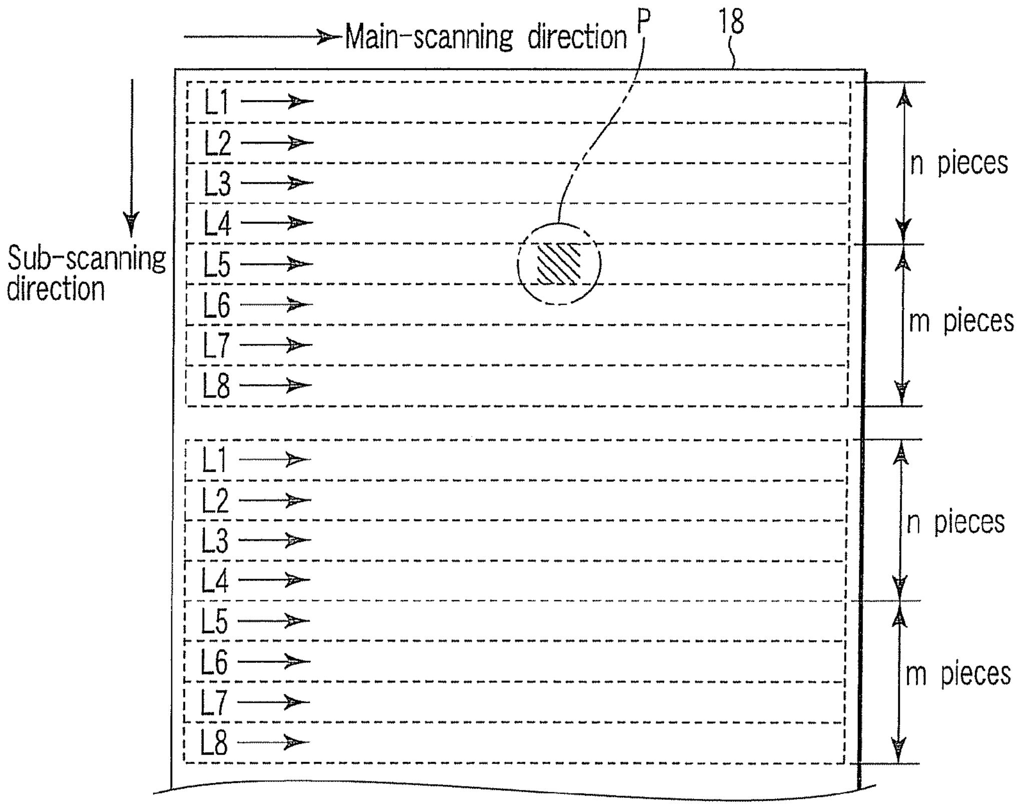
FIG. 7 is an exemplary view depicting line scanning to the white reference board of the one embodiment and an example of dust attached on the white reference board.

FIG. 7 illustrates the aspects of line scanning L1, L2, L3, and L4 of n pieces of lines (four pieces of lines) for the non-scanned area of the white reference member 18.

After this, the carriage 4 is moved, and the positions of the line scanning of the CCD sensor 10 for the white reference board 18 are moved (step 202). According to these movements, the line scanning of m pieces of lines, e.g., four lines for another scanning area of the white reference member 18 is performed. The first processing unit obtains the averaged value of the outputs from the CCD sensor 10 at this moment to shading-correct the averaged value on the basis of the stored white reference value (step 203). The shading correction eliminates the spots of the read image due to unevenness of the CCD sensor 10, the exposure lamp 5, the lens block 9 for variable power, or the like.

Figure 8:
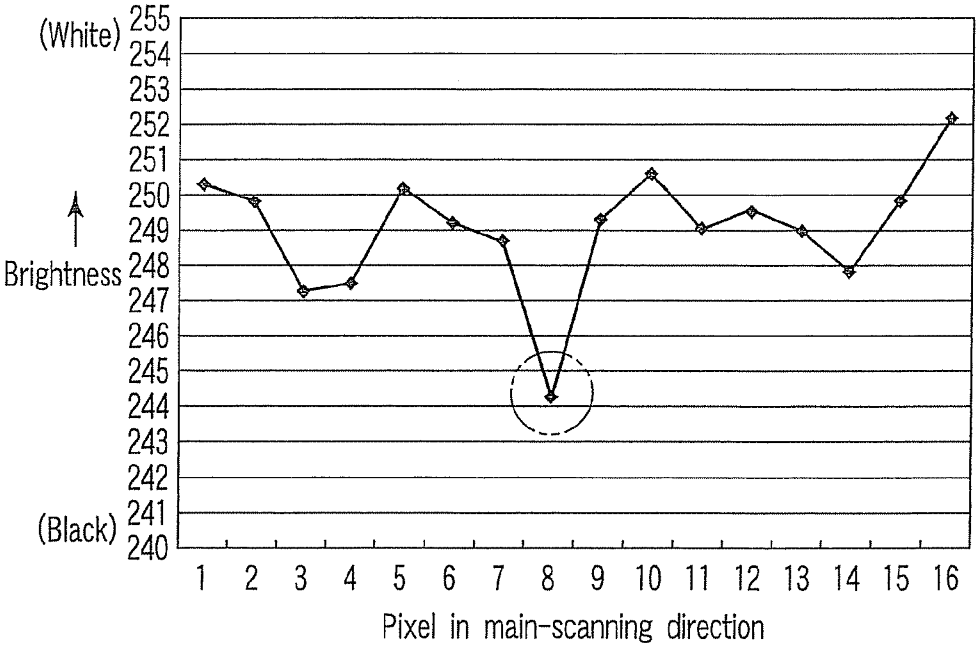
FIG. 8 is an exemplary view depicting variations in brightness of the white reference board by the line scanning in FIG. 7.

FIG. 7 illustrates the aspects of the line scanning L5, L6, L7, and L8 of the m pieces of lines (four lines) to another un-scanned area of the white reference member 18. In the example of FIG. 7, the dust P is adhered at the positions of the line scanning L5, L6, L7, and L8. FIG. 8 depicts a distribution of variations in brightness of the white reference board resulting from the line scanning L1, L2, L3, L4, L5, L6, L7, and L8. At the part of the dust P, the brightness is reduced.

Figure 9:
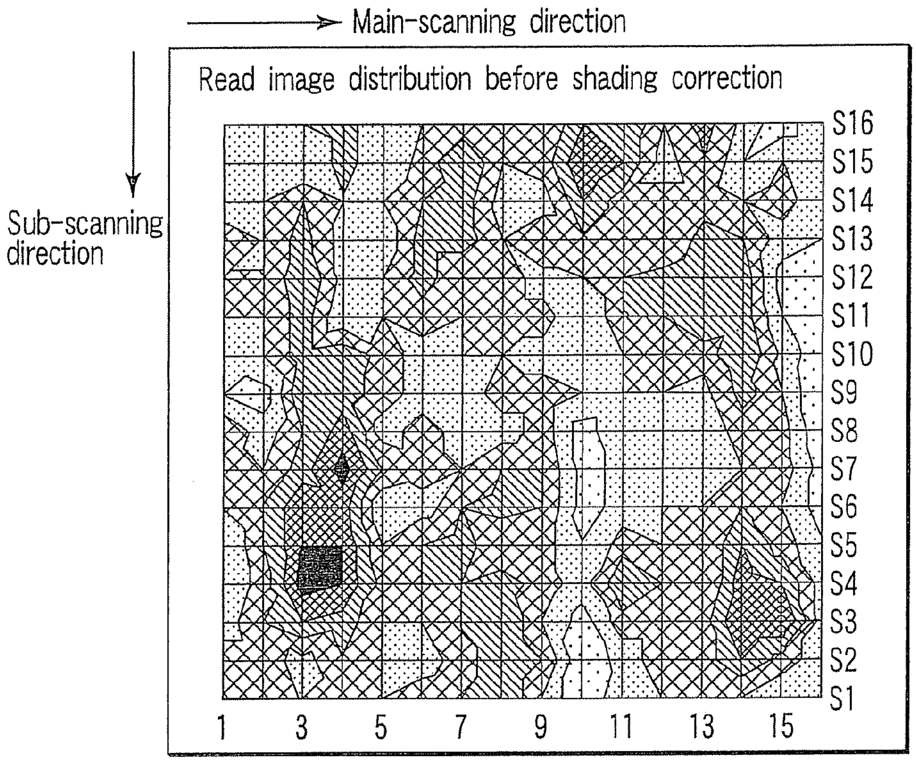
FIG. 9 is an exemplary view depicting a read image distribution of the white reference board before a shading correction in the embodiment.
Figure 10:
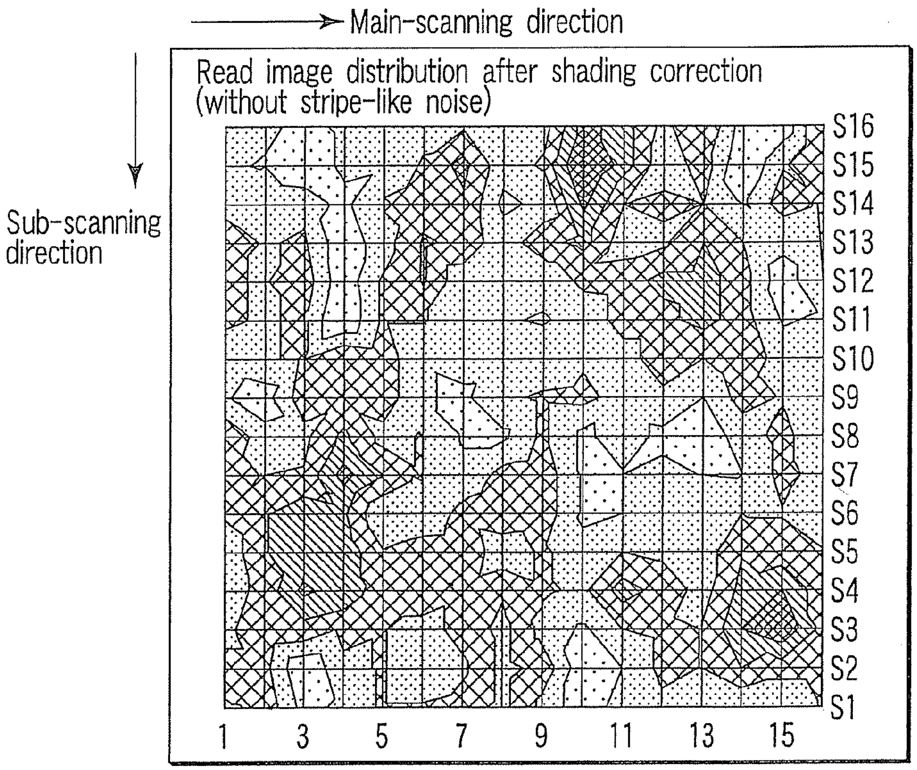
FIG. 10 is an exemplary view depicting a read image distribution of a white reference board after a shading correction in the embodiment to illustrate a state in which there is no stripe-like noise.
Figure 11:
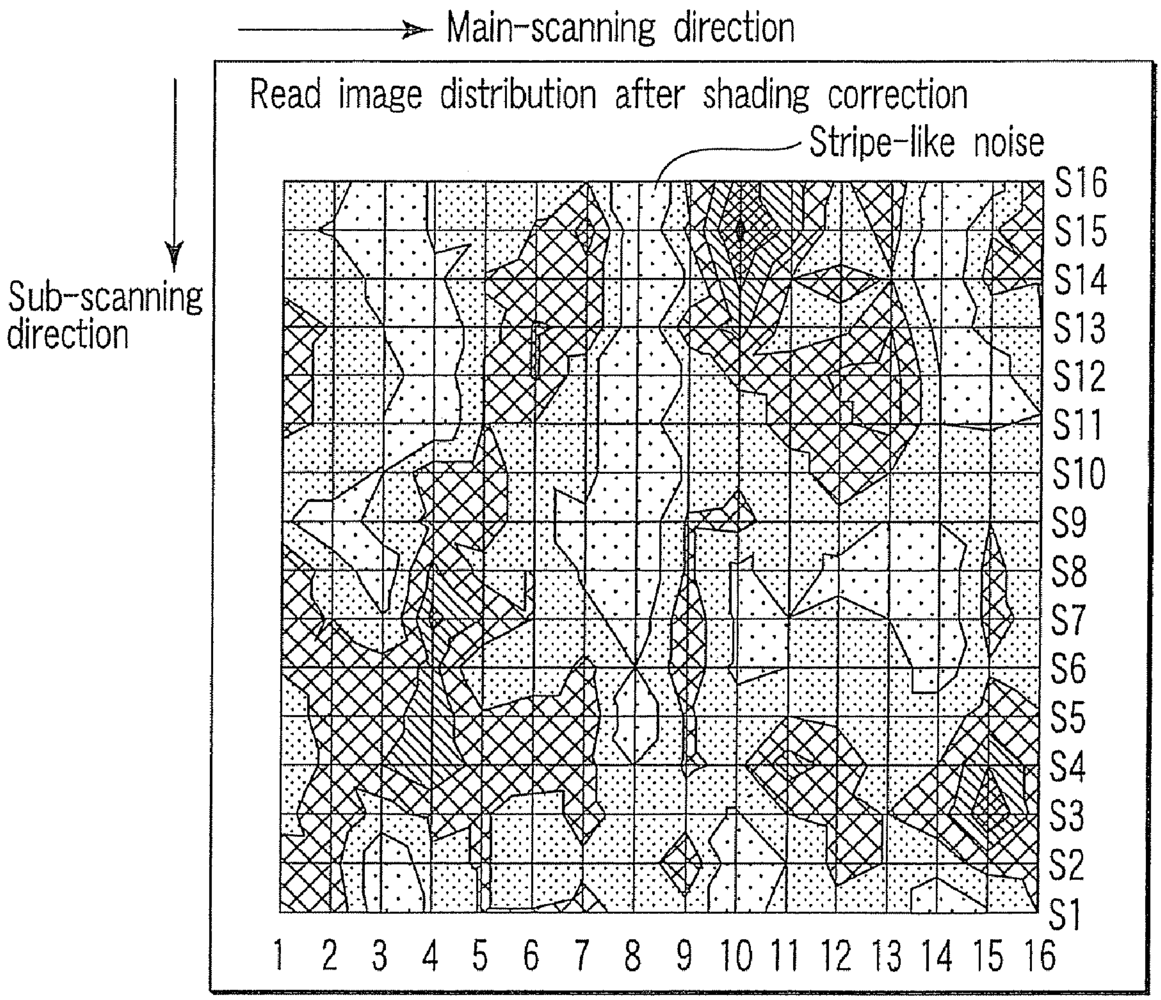
FIG. 11 is an exemplary view depicting a read image distribution of a white reference board after a shading correction in the embodiment to illustrate a state in which there is stripe-like noise.

FIGS. 9, 10 and 11 show the distributions of images read from the white reference board 18. FIG. 9 is a read image distribution before the shading correction is applied. FIG. 10 shows the read image distribution after the shading correction is applied, and illustrates a status in which the stripe-like noise is not included in the read image. FIG. 11 depicts a read image distribution after the shading correction to show a state in which the stripe-like noise is included in the read image.

When capturing the read image without any dust by the shading correction, the similarity degree in the main scanning direction, and the similarity degree in the sub-scanning direction of the read image are detected (step 204). The similarity degrees are expressed by so-called correlation factors.

Figure 12:
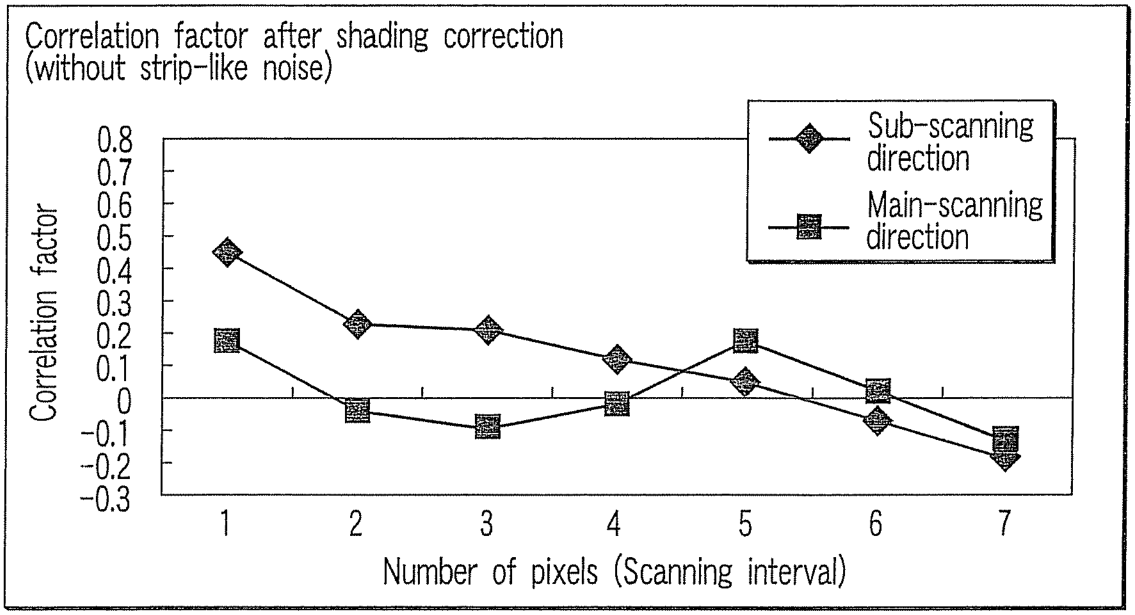
FIG. 12 is an exemplary view depicting correlation factors after the shading correction in the one embodiment to illustrate values when there is no stripe-like noise.

FIG. 12 depicts the variations in correlation factors in the main scanning direction and the sub-scanning direction when the read image does not include any stripe-like noise as shown in FIG. 10.

Figure 13:
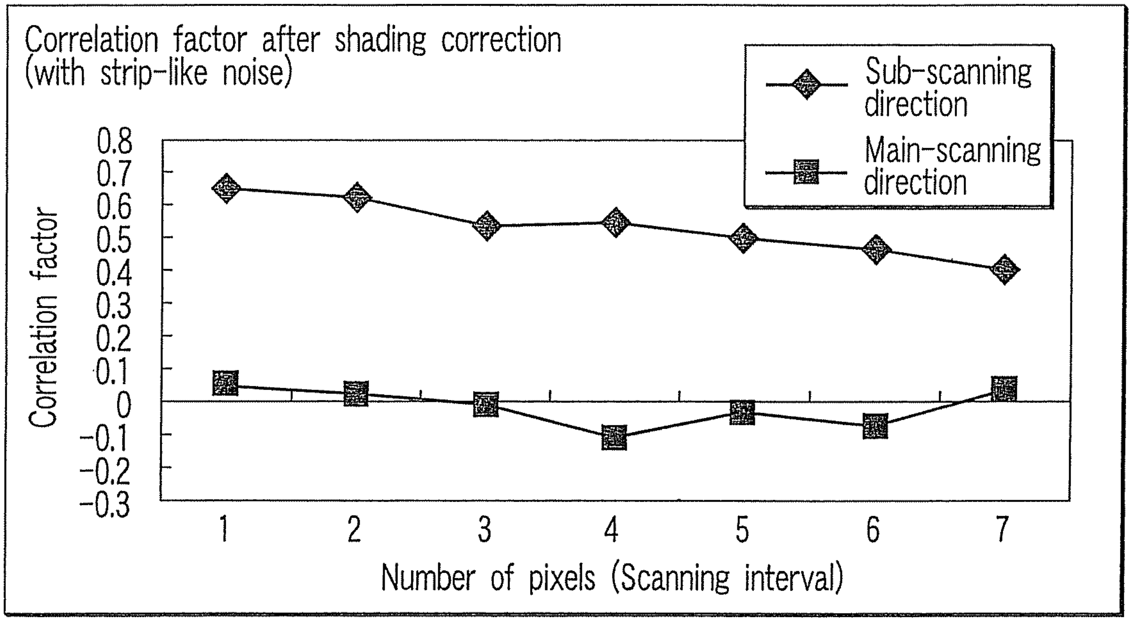
FIG. 13 is an exemplary view depicting the correlation factors after the shading correction in the one embodiment to illustrate values when there is stripe-like noise.

FIG. 13 illustrates the variations in the correlation factors in the main scanning direction and in the sub-scanning direction in the case in which the stripe-like noise is included in the read image as shown in FIG. 11. In other words, the read image in FIG. 11 having included the stripe-like noise extending in the sub-scanning direction, the value of the correlation factor in the sub-scanning direction has become large.

More specifically, the correlation factors in the main scanning direction do not vary so much regardless of presence or absence of any dust. The correlation factors in the sub-scanning direction, in the case of no presence of the dust, decreases as the intervals of the line scanning become large, and in the case of presence of the dust, it does not decreases so much.

Thus, based on each similarity indicated with each correlation factor, the presence or absence of the stripe-like noise in the read image after the shading correction is determined (step 205). Specifically, when the similarity degree is equal to or more than the prescribed set value (e.g., 0.3), it is determined that there is the stripe-like noise in the image of the part corresponding to the similarity degree. When the similarity degree is less than the set value, it is determined that there is no stripe-like noise in the image of the part corresponding to the similarity degree.

If the determination results show the presence of noise (NO, in step 206), the line scanning positions in the step 201 are moved as shown in FIG. 7. The steps 202 to 205 are then repeated.

If the determination results show the absence of the noise (YES, in step 206), and also the number of times of repetitions of noiseless processing has not reached the prescribed number (e.g., four times) (NO, in step 207), the line scanning positions in the step 201 move as depicted in FIG. 7. The steps 202 to 205 are then repeated.

When the number of the repetitions of the noiseless processing reaches the prescribed number K (YES, in step 207), the respective line scanning positions in the previous step 201 are respectively stored as the line scanning positions to the white reference member 18 in generating the white reference values for the next time (for every fixed hour) (step 208). Among each white reference value previously stored in the step 201, the averaged value of each white reference value, when the forgoing determination results show that there is no noise, is obtained, and the averaged value is decided (created) as the white reference value for the shading correction in reading the document D after that time (step 209). The decided white reference value is stored in the white memory of the image processing unit 73.

As mentioned above, the shading correction of the image read from the white reference board 18, and the determination of the presence or absence of the stripe-like noise in the read image after the shading correction enable creating an appropriate white reference value for the shading correction, even if there is little noise on the white reference board 18. Therefore, an excellent read image without any stripe-like noise may be captured regardless of the granularity of the surface of the white reference board 18, the dust adherent thereto, and the spots adherent thereto.

The creation of the black reference value and the white reference value are performed not only at the time when the power switch turned on, but also at every fixed time, Hereinafter, the method of shading correction will be described. The shading method performs a normalized correction in accordance with the following formula (1) to the outputs from the CCD sensor 10, and obtains an image signal S(i) which has been already corrected.

$$S(i)=\{[s(i)-B](i)]/[w(i)-B(i)]\}\times G\times H \tag{1}$$

Wherein, i is an index indicating that it is the i-th image signal of the CCD sensor 10;

w(i) is a white level of the white reference board 18;

B(i) is a black level (generally, input level in turning off an exposure lamp);

s(i) is an output from CCD sensor 10;

G is a dynamic range (e.g., 4,096 in the case of 12-bit width); and

H is a correction factor.

The white level of the white reference board 18 is brightness almost equal to brightness of a white color of a ground of a generic document D, or brightness brighter than that of the ground of the generic document D. Therefore, the correction evidence of the brightness higher than the white color of the ground of the document D, or than the white color of the white reference board 18 becomes to exceed a dynamic range G, it results in saturation. Therefore, to prevent the saturation, the brightness is set to around H=0.7.

In the formula (1), the output s(i) from the CCD sensor 10 is expressed by the following formula (2) using a real image signal g(i) read from the document D, a spot L(i) of the exposure lamp 5 and the optical system, variations C(i) in sensitivity of the CCD sensor 10, and a black level B(i). A read image signal W(i) from the white reference board 18 is expressed by the following formula (3), if the reference read image signal is represented as w(i).

$$S(i)=g(i)\times L(i)\times C(i)-B(i) \quad (2)$$

$$W(i)=w(i)\times L(i)\times C(I)-B(i) \quad (3)$$

The shading correction substitutes the given formulas (2) and (3) into the given formula (1), and it is expressed by the following formula (4)

$$S(i)=[g(i)/w(i)]\times G\times H \quad (4)$$

In a word, an even read image signal, which is not affected by the variations C(i), in the spot L(i) of the exposure lamp 5 and the optical system, and in the sensitivity of the CCD sensor 10, or the like, may be obtained. However, in regard to the distribution w(i) owned by the white reference board 18, it is influenced by the inverse thereof. Namely, if there is any black dust on the white reference board 18, the read image captured by the output from the CCD sensor 10 becomes one having a white spot. In the shading correction, the reference read image signal w(i) not having varied while it is scanned in the sub-scanning direction to be read, it results in an occurrence of strip-like noise extending toward the sub-scanning direction and in highly visible spots.

On the other hand, the correlation factor to detect the stripe-shape noise will be described hereinafter.

Here, the image data obtained by the line scanning (main scanning direction) is represented by xi, and the image data at the position deviated by p pixel from the line scanning position in the sub-scanning direction is expressed by yi. The correlation factor between the image data xi and yi is represented by σxy. The correlation factor σxy is referred as to a sub carrier correlation factor of a scanning interval p, and expressed by the following formula (5).

$$\sigma xy=COV(X,Y)/\sigma x\times\sigma y \quad (5)$$

Wherein, each value is expressed as follows:

$$\mathrm{COV}(X,Y)=1\frac{1}{n}\sum_{j}^{n}(Xj-\mu x)(Yj-\mu y)$$

$$\sigma x\hat{}2=\frac{1}{n}\sum_{j}^{n}(Xj-\mu x)\hat{}2$$

$$\sigma y\hat{}2=\frac{1}{n}\sum_{j}^{n}(Yj-\mu y)\hat{}2$$

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus, comprising:

a document platen to which a document is set;

a white reference member;

an exposure lamp to expose the document and the white reference member;

a photoelectric conversion element which receives reflected light from the document and the white reference member when the document is exposed by the exposure lamp and the white reference member is exposed by the exposure lamp to output an image signal with a level corresponding to a light receiving quantity; and an image processing unit which has a first processing unit to expose the white reference member by the exposure lamp and to create a white reference value for a shading correction from the output from the photoelectric conversion element at that time, and also has a second processing unit to expose the document by the exposure lamp, to apply a shading correction to the output from the photoelectric conversion element at that time in accordance with the white reference value, and to obtain an image read from the document, wherein the first processing unit comprises:

a first control section which performs line scanning an un-scanned area of the white reference member by the exposure from the exposure lamp to obtain a signal corresponding to an image of the white reference member from the photoelectric conversion element;

a second control section which stores the output from the photoelectric conversion element in the line scanning in the first control section as a white reference value for the shading correction;

a third control section which performs line scanning to an un-scanned area differing from that of by the first control section by the exposure from the exposure lamp;

a correction section which applies the shading correction to the output from the photoelectric conversion element in line scanning by the third control section in accordance with the white reference value to obtain an image read from the white reference member;

a detection section which detects a similarity degree in a main scanning direction and a similarity degree in a sub-scanning direction of the image read by the correction section;

a determining section which determines presence or absence of stripe-like noise in the image read by the correction section from each similarity detected by the detection section;

a fourth control section which moves line scanning positions in the first control section to repeat processing by the second section, the third section, the correction section, the detection section, and the determining section when the determination result from the determining section shows the presence of the noise;

a storage section which stores a line scanning position by the first control section when the determination result from the determining section shows the absence of the noise as a line scanning position to the white reference member in creating the next white reference value; and a decision section which decides the white reference value, at the time when the determination result from the determining section shows that there is no noise, as a white reference value for a shading correction in reading a document after that time among each white reference value stored by the second control section.

2. The apparatus according to claim 1, wherein, when each similarity detected from the detection section is equal to or larger than that of a predetermined set value, the determining section determines that there is stripe-like noise in images at parts corresponding to each of the similarity, and when each of the similarity detected from the diction section is smaller than that of the set value, the determining section determines that there is no stripe-like noise in the images at the parts corresponding to each of the similarity.

3. The apparatus according to claim 2, wherein the second control section obtains an averaged value of the output from the photoelectric conversion element in the exposure by the first control section to store the averaged value as the white reference value for the shading correction; and the correction section obtains an averaged value of the output from the photoelectric conversion element in the exposure by the third control section to apply a shading correction to the average value in accordance with the white reference value.

4. The apparatus according to claim 2, further comprising:

a fifth control section which moves line scanning positions in the first control section to repeat the processing in the second, the third, the detection, and the determining sections by the number of preset prescribed times when the determination result from the determining section shows that there is no noise.

5. The apparatus according to claim 4, wherein the decision section obtains an averaged value of each white reference value when the determination result from the determining section shows that there is no noise among each white reference value stored by the second control section after repetitions by the fifth control section to decide the average value as a white reference value for shading correction in reading the document after that time.

6. The apparatus according to claim 1, wherein the first processing unit further comprises a fifth control section, which decides the output from the photoelectric conversion element during turning off of the exposure lamp as a black reference value for shading correction in reading the document after that time.

7. An image forming apparatus, comprising:

a document platen to which a document is set;

a white reference member;

exposure means for exposing the document and the white reference member;

photoelectric conversion means for receiving reflected light from the document and the white reference member when the document is exposed by the exposure means and the white reference member is exposed by the exposure means, and for outputting an image signal with a level corresponding to a light receiving quantity; and image processing means for including first processing means for exposing the white reference member by the exposure means to create a white reference value for a shading correction from the output from the photoelectric conversion means at that time, and also including second processing means for exposing the document by the exposure means, applying a shading correction to the output from the photoelectric conversion means at that time in accordance with the white reference value, and obtaining an image read from the document, wherein the first processing means comprises:

first control means for performing line scanning to an unscanned area of the white reference member by the exposure from the exposure means to obtain a signal corresponding to an image of the white reference member from the photoelectric conversion means;

second control means for storing the output from the photoelectric conversion means for performing the line scanning by the first control means as a white reference value for the shading correction;

third control means for performing line scanning to an un-scanned area differing from that of by the first control means by the exposure from the exposure means;

correction means for applying the shading correction to the output from the photoelectric conversion means in performing the line scanning by the third control means in accordance with the white reference value to obtain an image read from the white reference member;

detection means for detecting a similarity degree in a main scanning direction and a similarity degree in a sub-scanning direction of the read image obtained by the correction means;

determining means for determining presence or absence of stripe-like noise in the image obtained by the correction means from each similarity detected by the detection means;

fourth control means for moving line scanning positions by the first control means to repeat processing by the second control means, the third, the correction, the detection, and the determining means when the determination result from the determining means shows that there is the noise; and decision means for storing the line scanning positions, in the first control means when the determination result from the determining means shows that there in no noise, as a line scanning position to the white reference member in creating the next white reference value, and for deciding the white reference value, when the determination result from the determining section shows that there is no noise, as a white reference value for a shading correction in reading a document after that time among each white reference value stored through the second control means, and also deciding the white reference value, at the time when the determination result from the determining section shows that there is no noise, as a white reference value for a shading correction in reading a document after that time among each white reference value stored by the second control means.

8. The apparatus according to claim 7, wherein when each similarity detected from the detection means is equal to or larger than a predetermined set value, the determining means determines that there is stripe-like noise in images at parts corresponding to each of the similarity, and when each of the similarity detected from the diction means is smaller than the set value, the determining means determines that there is no stripe-like noise in the images at the parts corresponding to each of the similarity.

9. The apparatus according to claim 8, wherein the second control means obtains an averaged value of the output from the photoelectric conversion means in the exposure by the first control means to store the averaged value as the white reference value for the shading correction; and the correction means obtains an averaged value of the output from the photoelectric conversion means in the exposure by the third control means to apply a shading correction to the averaged value in accordance with the white reference value.

10. The apparatus according to claim 8, further comprising:

fifth control means for moving a line scanning position by the first control means to repeat the processing by the second control means, the third control means, the correction means, the detection means, and the determining means by the number of preset prescribed times when the determination result from the determining means shows that there is no noise.

11. The apparatus according to claim 10, wherein the decision means obtains an averaged value of each white reference value when the determination result from the determining means shows that there is no noise among each white reference value stored by the second control means after repetitions by the fifth control means to decide the averaged value as a white reference value for the shading correction in reading the document after that time.

12. The apparatus according to claim 7, wherein the first processing means further includes a fifth control means, which creates the output from the photoelectric conversion means during turning off of the exposure means as a black reference value for a shading correction in reading the document after that time.

13. A control method of an image forming apparatus, comprising:

a document platen on which a document is set;

a white reference member;

an exposure lamp to expose the document and the white reference member;

a photoelectric conversion element which receives reflected light from the document and the white reference member when the document is exposed by the exposure lamp and the white reference member is exposed by the exposure lamp to output an image signal with a level corresponding to a light receiving quantity; and an image processing unit which includes a first processing unit to expose the white reference member by the exposure lamp and to create a white reference value for a shading correction from the output from the photoelectric conversion element at that time, and also has a second processing unit to expose the document by the exposure lamp, to apply a shading correction to the output from the photoelectric conversion element at that time in accordance with the white reference value, and to obtain an image read from the document, wherein the first processing unit performs the steps of:

performing first line scanning of an un-scanned area of the white reference member by the exposure from the exposure lamp to obtain a signal corresponding to an image of the white reference member from the photoelectric conversion element;

storing the output from the photoelectric conversion element in the first line scanning as the white reference value for the shading correction;

performing second line scanning of an un-scanned area differing from that of in the first line scanning by the exposure from the exposure lamp;

applying the shading correction to the output from the photoelectric conversion element in the second line scanning in accordance with the white reference value to obtain an image read from the white reference member;

detecting a similarity degree in a main scanning direction and a similarity degree in a sub-scanning direction of the image read from the white reference member;

determining presence or absence of stripe-like noise in the image read from the white reference member from each detected similarity;

moving the first line scanning position when the determination result shows that there is noise to repeat processing of the storing, the second line scanning, the correction, the detection, and the determining; and storing the first line scanning position, when the determination result shows that there in no noise, as a line scanning position for a white reference member in creating the next white reference value, and also deciding a white reference value, when the determination result shows that there is no noise among the stored each white reference value, as a white reference value for a shading correction in reading a document after that time.

* * * * *